US010523993B2

(12) United States Patent
Hager, IV

(10) Patent No.: US 10,523,993 B2
(45) Date of Patent: Dec. 31, 2019

(54) DISPLAYING CUSTOM POSITIONED OVERLAYS TO A VIEWER

(71) Applicant: Disney Enterprises, Inc., Burbank, CA (US)

(72) Inventor: Joseph George Hager, IV, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 519 days.

(21) Appl. No.: 14/516,311

(22) Filed: Oct. 16, 2014

(65) Prior Publication Data

US 2016/0112750 A1    Apr. 21, 2016

(51) Int. Cl.
| | |
|---|---|
| *H04N 21/43* | (2011.01) |
| *H04N 21/41* | (2011.01) |
| *H04N 21/431* | (2011.01) |
| *H04N 21/435* | (2011.01) |
| *H04N 21/81* | (2011.01) |
| *H04N 21/8547* | (2011.01) |
| *G06K 9/00* | (2006.01) |
| *H04N 21/4725* | (2011.01) |
| *H04N 21/422* | (2011.01) |
| *H04N 21/442* | (2011.01) |

(52) U.S. Cl.
CPC ..... *H04N 21/4307* (2013.01); *G06K 9/00671* (2013.01); *H04N 21/4122* (2013.01); *H04N 21/4126* (2013.01); *H04N 21/42202* (2013.01); *H04N 21/4316* (2013.01); *H04N 21/4355* (2013.01); *H04N 21/44218* (2013.01); *H04N 21/4725* (2013.01); *H04N 21/8133* (2013.01); *H04N 21/8547* (2013.01)

(58) Field of Classification Search
CPC ........... H04N 21/4307; H04N 21/4122; H04N 21/4126; H04N 21/4316
USPC .............................................. 725/34; 345/633
See application file for complete search history.

(56) References Cited

U.S. PATENT DOCUMENTS 5,873,003 A * 2/1999 Inoue .................... G02B 7/287
                                                          257/E27.136
6,661,425 B1   12/2003 Hiroaki
8,643,703 B1   2/2014 Karakotsios et al.
(Continued)

OTHER PUBLICATIONS

Google Glass, Wikipedia: The Free Encyclopedia, modified Oct. 14, 2014 <http://en.wikipedia.org/wiki/Google_Glass>.

*Primary Examiner* — Ryan F Pitaro
(74) *Attorney, Agent, or Firm* — Patterson + Sheridan, LLP

(57) ABSTRACT

Aspects described herein include a user display unit that determines a portion of a presentation currently being viewed by a user through a transparent display. For example, if the display area is a theater screen, only a portion of the screen may be viewable to the user through the transparent display. The display unit may display metadata on the transparent display with a spatial relationship to one or more objects in the presentation. For example, the display unit may output a text bubble near an actor in the presentation that provides an interesting fact about the actor which may overlay or occlude the presentation. In one aspect, if the object in the presentation moves or the display unit is reoriented, the display unit may move the metadata to maintain the spatial relationship between the object and the metadata in the transparent display.

15 Claims, 7 Drawing Sheets

(56) References Cited

U.S. PATENT DOCUMENTS

| | | | | |
|---|---|---|---|---|
| 8,704,879 B1* | 4/2014 | Cheng | | G06F 3/013 348/51 |
| 9,274,597 B1* | 3/2016 | Karakotsios | | G06F 3/0346 |
| 2005/0021679 A1* | 1/2005 | Lightman | | G06Q 30/02 709/219 |
| 2007/0247477 A1* | 10/2007 | Lowry | | H04N 13/341 345/629 |
| 2007/0277092 A1* | 11/2007 | Basson | | H04N 21/4348 725/60 |
| 2008/0186255 A1* | 8/2008 | Cohen | | G02B 27/017 345/8 |
| 2010/0053151 A1 | 3/2010 | Marti et al. | | |
| 2011/0018903 A1 | 1/2011 | Lapstun et al. | | |
| 2011/0212717 A1* | 9/2011 | Rhoads | | G06K 9/00664 455/420 |
| 2011/0213664 A1 | 9/2011 | Osterhout et al. | | |
| 2011/0285833 A1* | 11/2011 | Tsurumoto | | G09G 3/003 348/56 |
| 2011/0310120 A1 | 12/2011 | Narayanan | | |
| 2012/0032851 A1* | 2/2012 | Horsey | | G01S 3/46 342/442 |
| 2012/0086801 A1* | 4/2012 | Larsen | | G01B 11/026 348/135 |
| 2012/0092328 A1* | 4/2012 | Flaks | | G02B 27/017 345/419 |
| 2012/0147157 A1 | 6/2012 | Wu et al. | | |
| 2012/0176366 A1* | 7/2012 | Genova | | G06T 15/205 345/419 |
| 2012/0190439 A1* | 7/2012 | Nourbakhsh | | G02B 27/2264 463/31 |
| 2012/0194418 A1 | 8/2012 | Osterhout et al. | | |
| 2012/0212499 A1 | 8/2012 | Haddick et al. | | |
| 2012/0313936 A1 | 12/2012 | Matsumoto | | |
| 2013/0050432 A1* | 2/2013 | Perez | | G02B 27/017 348/47 |
| 2013/0083003 A1 | 4/2013 | Perez et al. | | |
| 2013/0160039 A1* | 6/2013 | Mentz | | H04N 21/418 725/14 |
| 2013/0234934 A1 | 9/2013 | Champion et al. | | |
| 2013/0278631 A1 | 10/2013 | Border et al. | | |
| 2013/0293468 A1* | 11/2013 | Perez | | G06F 3/033 345/158 |
| 2013/0293530 A1* | 11/2013 | Perez | | G06K 9/00671 345/418 |
| 2013/0293577 A1* | 11/2013 | Perez | | G02B 27/017 345/633 |
| 2013/0300637 A1 | 11/2013 | Smits et al. | | |
| 2013/0321390 A1* | 12/2013 | Latta | | G06T 11/00 345/419 |
| 2013/0335405 A1* | 12/2013 | Scavezze | | G06T 19/20 345/419 |
| 2014/0002351 A1 | 1/2014 | Nakayama | | |
| 2014/0002492 A1 | 1/2014 | Lamb et al. | | |
| 2014/0002753 A1* | 1/2014 | Griffin | | H04W 88/06 348/734 |
| 2014/0063061 A1* | 3/2014 | Reitan | | G09G 3/003 345/633 |
| 2014/0121015 A1* | 5/2014 | Massing | | G07F 17/3211 463/33 |
| 2014/0310595 A1* | 10/2014 | Acharya | | G06F 9/453 715/706 |
| 2015/0097965 A1* | 4/2015 | Stout | | H04N 5/23216 348/164 |
| 2015/0234050 A1* | 8/2015 | Larson | | G01S 17/66 356/369 |
| 2015/0237333 A1* | 8/2015 | Smoot | | H04N 13/302 348/54 |
| 2016/0015470 A1* | 1/2016 | Border | | G02B 27/017 600/117 |

* cited by examiner

DISPLAYING CUSTOM POSITIONED OVERLAYS TO A VIEWER

BACKGROUND

Field of the Invention

The present disclosure is related to displaying metadata on a transparent display that corresponds to a presentation, and more specifically, to maintaining a spatial location between the metadata and an object in the presentation as the object moves in the transparent display.

Description of the Related Art

Media presentations such as movies, television, sporting events, concerts, and the like may be displayed on screens in a theater, televisions, or computer screens. Some viewers, however, may want to access metadata associated with the media presentation that is not included in the presentation. For example, the viewers may be interested about a geographic location depicted in the presentation or interesting facts about the actors in the presentation. These viewers may multitask by using a portable electronic device such as a smartphone or tablet computer to access metadata about the media presentation. These portable electronic devices are referred to as "second screen" devices that permit the user to access the metadata regarding the media presentation displayed on the "first screen"—i.e., the theater screen, television, or computer.

SUMMARY

One aspect described herein is a method that includes determining a bounded region comprising at least a portion of a display area that is viewable by a user through a transparent display and receiving synchronization information associated with a presentation occurring in the display area. The method also includes displaying metadata at a first location on the transparent display based on the synchronization information where the metadata corresponding with an object in the presentation. Upon determining that a location of the object in the transparent display has changed, the method includes displaying the metadata at a second, different location on the transparent display based on the changed location of the object.

Another aspect described herein includes a computer program product for displaying metadata in a transparent display that includes a computer-readable storage medium having computer-readable program code embodied configured to determine a bounded region comprising at least a portion of a display area that is viewable by a user through the transparent display and receive synchronization information associated with a presentation occurring in the display area. The program code is further configured to display metadata at a first location on the transparent display based on the synchronization information where the metadata corresponding with an object in the presentation. Upon determining that a location of the object in the transparent display has changed, the program code is configured to display the metadata at a second, different location on the transparent display based on the changed location of the object.

Another aspect described herein is a display unit that includes a transparent display that permits a user to view a presentation occurring in a display area external to the display unit and a communicator configured to receive synchronization information associated with the presentation. The display unit also includes a processor configured to perform an operation where the operation includes determining a bounded region comprising at least a portion of the display area that is viewable by the user through the transparent display and displaying metadata at a first location on the transparent display based on the synchronization information where the metadata corresponding with an object in the presentation. Upon determining that a location of the object in the transparent display has changed, the operation includes displaying the metadata at a second, different location on the transparent display based on the changed location of the object.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
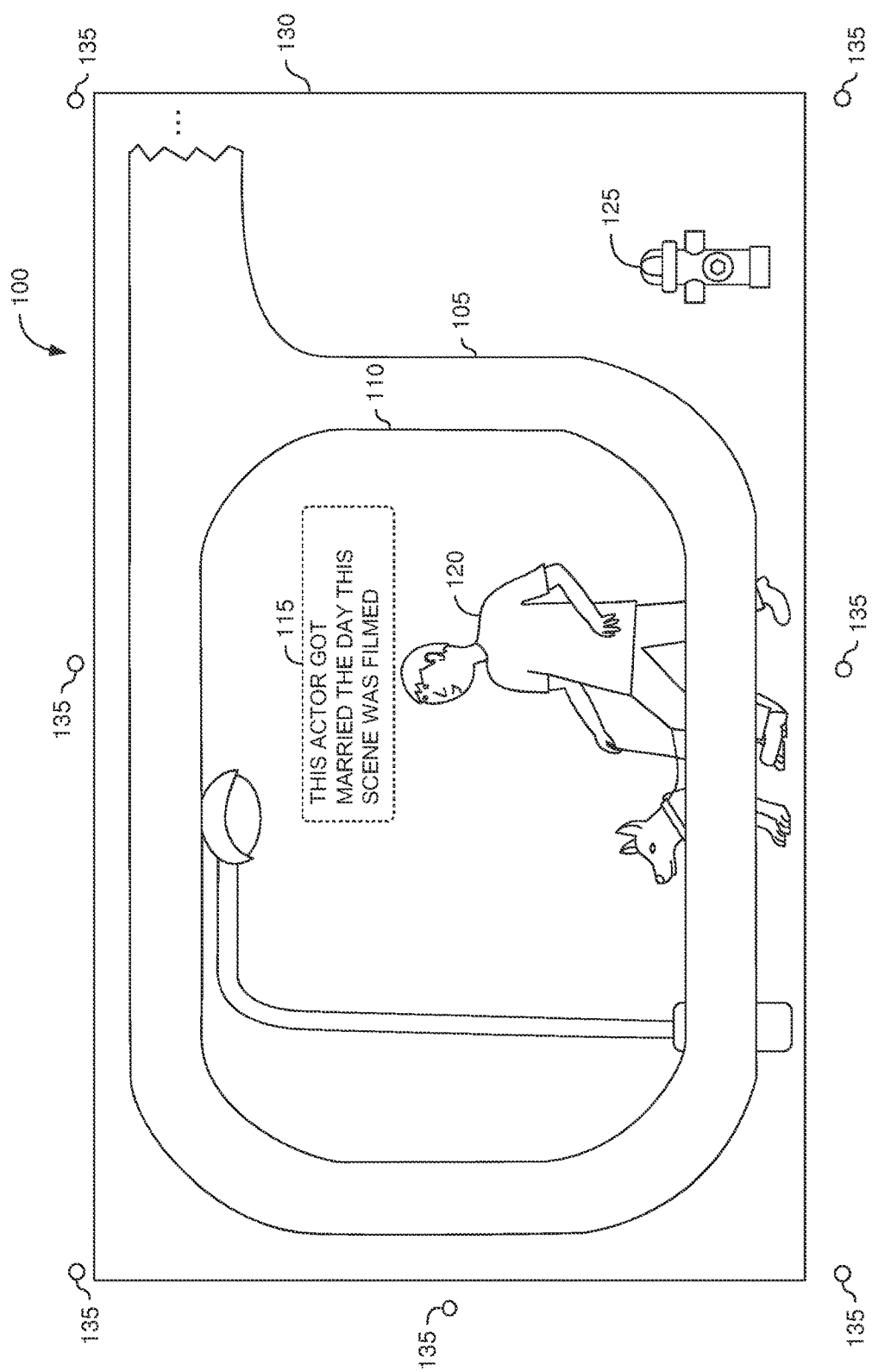
FIG. 1 illustrates a user display unit for providing metadata corresponding to an object in a media presentation, according to one embodiment described herein.

To provide metadata to viewers of a presentation, the embodiments and aspects described below include a user display unit with at least one transparent display for outputting metadata to the viewer. The metadata may include supplemental information regarding the presentation such as information about an actor, a geographic location in the presentation, facts about making the presentation, a game associated with the presentation (e.g., trivia), a special effects enhancement for the presentation, and the like. In one example, the user display unit may be a wearable device (e.g., glasses) that the viewer positions between her eyes and a display area where the presentation is displayed. The user display unit may be synchronized with the presentation such that the metadata is displayed to the viewer in synch with the presentation. For example, a show controller may send time codes to the user display unit which the unit then uses to determine when to display the metadata to the viewer.

In one aspect, the user display unit determines a portion of the presentation currently being viewed by the user through the transparent display. Stated differently, the transparent display may include only a portion of a display area used for the presentation. For example, if the display area is a theater screen, only a portion of the screen may be viewable to the user through the transparent display. Once the user display unit determines what portion of the display area is being viewed through the transparent display, the unit then displays metadata on the transparent display corresponding to one or more objects in the presentation. For example, the display unit may output a text bubble near an actor in the presentation that provides an interesting fact about the actor or an arrow that points to a blooper occurring within the presentation.

In one aspect, the metadata overlaps or occludes a portion of the presentation. For example, displaying metadata about one actor may occlude a portion of the presentation that includes a second actor. As an alternative, the metadata may be displayed on the transparent display such that the metadata is outside the display area if possible so as to not occlude the user's view of the presentation.

In one aspect, if the object in the presentation moves or the display unit is reoriented such that a different portion of the display area is within the transparent display, the user display unit may maintain the spatial relationship between the object and the metadata in the transparent display. To do so, the user display unit may receive positional information from the emitters that correspond to different portions of the display area. In one example, infrared (IR) emitters may be spaced at predefined intervals around a periphery of the display area. Based on the positional information provided by the emitters, the user display unit identifies a bounded region indicating what portion of the display area is currently being viewed by the user through the transparent display. Furthermore, in one aspect, the display unit may include additional sensors such as gyroscopes, accelerometers, magnetometers, and the like that may be used to identify the orientation of the display unit. The data provided by these sensors may be combined with the positional information provided by the emitters to adjust the location of the bounded region, thereby determining what portion of the display area is currently being viewed by the user through the transparent display. When the user reorients the display unit, the bounded region may be recalculated and then used to move the metadata to a different location on the transparent display such that the spatial relationship between the metadata and the object is maintained within the transparent display. Similarly, if the display unit remains at the same orientation but the object in the presentation moves, the display unit may move the metadata to track the object and maintain the spatial relationship.

FIG. 1 illustrates a user display unit 105 for providing metadata corresponding to an object 120 in a media presentation, according to one embodiment described herein. In system 100, a display screen 130 is used to display the media presentation to a user. The screen 130 may be a theater screen, a television, projector screen, and the like, while the presentation may be a movie, television show, sporting event, concert, etc. The user display unit 105 includes a display 110 that is transparent so that a user can view the media presentation through the display 110. Non-limiting examples of suitable transparent display technologies (also referred to as see-through displays) includes transparent LCD displays and transparent OLED displays. However, any display technology that permits the user to view the presentation through the display 110 and still output text, images, or video on the display 110 is included within the scope of this disclosure.

As shown, only a portion of the display screen 130 is viewable to the user via the transparent display 110. For example, FIG. 1 illustrates that the user display unit 105 may be a pair of glasses worn by a user such that the display 110 is between the user's eye and the display screen 130. Thus, only a portion of the presentation is viewable by the user through the transparent display 110. Moreover, FIG. 1 illustrates only one half of the glasses. The unit 105 may also include a second transparent display that corresponds to a user's second eye.

For object 125, the display 110 is not between the user's eye and the display screen 130, while for object 120 the display 110 is between the user's eye and the display screen 130. However, portions of the presentation outside of the boundary of the display 110 may still be viewable by the user. For example, object 125 is outside of the boundary of the display 110, but may nonetheless be viewable by the user. Although FIG. 1 illustrates that only a portion of the display screen 130 is within the boundary of the display 110, the aspects described below may also be used when all of the display screen 130 is within the boundary of the display 110.

In FIG. 1, the unit 105 displays metadata 115 on the transparent display 110. As such, metadata 115 is not part of the presentation being shown on the display screen 130, but rather includes supplemental information corresponding to one or more objects in the presentation. Thus, if a user views the presentation without looking through the display 110, the user does not see the metadata 115. In this example, the metadata 115 is a text bubble that displays a fact about the object 120 (i.e., an actor in the presentation). Alternatively, the metadata 115 may be trivia question which the user attempts to answer using an I/O device on the user display unit 105, or a video about the geographic location of a particular scene, and the like. Regardless of the type of metadata 115 displayed, by viewing the display screen 130 through the display 110, the user is able to see the metadata 115 corresponding to the presentation without relying on a second screen.

The metadata 115 overlays a portion of the display screen 130 and may occlude the corresponding part of the presentation. That is, if there is an object in the presentation covered by metadata 115, the user may be unable to see the object. Alternatively, the metadata 115 may be sufficiently transparent or shaded such that the underlying presentation is still viewable by the user. For example, the display unit 105 may control the color scheme or brightness of the displayed metadata 115 such that the corresponding portion of the presentation is still viewable. Further still, although not shown in FIG. 1, if the boundary of the display 110 includes an area outside of the boundaries of the display screen 130, the user display unit 105 may select this area for displaying the metadata 115 to avoid occluding the presentation.

In one aspect, the user display unit 105 establishes a spatial relationship between the metadata 115 and the object 120. For example, the unit 105 may display the metadata 115 such that is above the object 120. Furthermore, the metadata 115 may include a visual indicator such as an arrow for informing the viewer that the object 120 corresponds to the metadata 115. However, if the object 120 moves in the presentation (e.g., the man moves to the left as he walks his dog) or the unit 105 is reoriented and the location of the metadata 115 on the display 110 is not updated, this spatial relationship may change which may confuse the user. For example, if the user turns his head to view object 125 and the metadata 115 remains in the same location, the user may mistakenly believe the supplemental information in the metadata 115 applies to object 125 rather than object 120. Thus, to maintain the spatial relationship, the user display unit 105 may update the portion of the presentation being viewed by the user through the transparent display 110. That is, as the user reorients the display unit 105 to look at a different portion of the display screen 130, the display unit 105 moves the metadata 115 to maintain the spatial relationship. Similarly, if the object 120 moves in the presentation, because the display unit 105 is synchronized with a show controller and can identify the new location of the object 120, the unit 105 can move the metadata 115 with the object 120 to maintain the spatial relationship.

In some examples, it may be impossible to maintain the spatial relationship. For example, as the object 120 moves to the left of the display screen 130, if the metadata 115 maintains the same spatial relationship then a part of the text in metadata 115 may fall outside of the display 110, and thus, would not be viewable. In this case, the display unit 105 may alter the spatial relationship (e.g., shift the metadata 115 so it is displayed to the right of the object 120) in order to keep the metadata 115 within the viewable area of the display 110. Thus, although the display unit 105 may attempt to maintain the same spatial location, the spatial location does not need to be permanently fixed but can change for any number of reasons—e.g., avoid occluding certain objects in the presentation, avoid the periphery of the display 110 where the user may have difficulty reading the text in the metadata 115, and the like.

The system 100 also includes emitters 135 that transmit location information to the user display unit 105. As shown, the emitters 135 are spaced along the periphery of the display screen 130. In FIG. 1, the system 100 includes six emitters 135 but other systems may include more or less than this number. Additionally or alternatively, the system 100 may include emitters 135 within the screen 130. For example, the emitters 135 may be small enough that they are not noticed by the viewer. In one aspect, the emitters 135 use a line-of-sight (LOS) transmission technique to transmit the location information to the user display unit 105—e.g., infrared (IR) emitters.

In one aspect, each emitter 135 transmits a different code that indicates to the display unit 105 which portion of the display screen 130 is currently being viewed by the user via the display 110. For example, the display unit 105 may receive the codes corresponding to only the emitters 135 that have LOS with the unit 105. Based on this received codes, the display unit 105 then derives what portion of the display screen 130 is currently within the boundaries of the display 110. As will be described in greater below, the location information obtained from the emitters 135 may be combined with data measured by sensor located on the unit 110 (e.g., gyroscopes, accelerometers, magnetometers, and the like). For example, the distance from the unit 105 and the display screen 130 may be determined from the location information transmitted by the emitters 135 while the elevation or direction (e.g., North, South, East, or West) of the display 110 is determined using the data from sensors located on the display units 105. Based on the sensor data, the display unit 105 determines the portion of the display screen 130 that is within the boundary of the display 110.

As mentioned previously, the user display unit 105 may include two transparent displays 110—one for each eye. Because of the different perspectives of each eye, the location of the metadata 115 on the respective displays 110 may be slightly different. Nonetheless, from the perspective of the user, the metadata 115 would correspond to the same location. Thus, even though the user's eyes may have different perspectives, the display unit 105 can output the metadata 115 on both screens such that the user sees the metadata 115 at the same location above object 120. In one aspect, the metadata 115 may be displayed in 3D which may capture the user's attention or indicate to the user that the text is metadata rather than text that is part of the presentation. In one alternative, the metadata 115 may use a distinctive color scheme that attracts the user's attention and/or indicates to the user that the metadata 115 is not part of the underlying presentation.

Figure 2A:
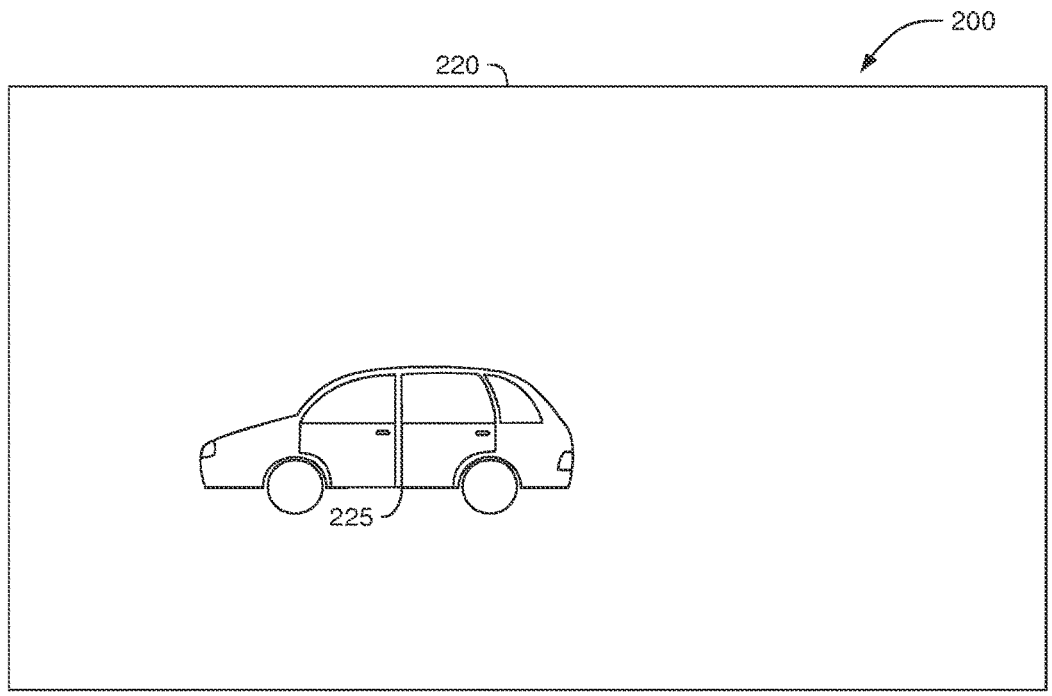
FIGS. 2A-2D illustrate systems for maintaining a spatial relationship between metadata and an object in a media presentation, according to embodiments described herein.

FIGS. 2A-2D illustrate systems for maintaining a spatial relationship between metadata and an object in a media presentation, according to embodiments described herein. Specifically, FIG. 2A illustrates a system 200 that includes a display screen 220 displaying a media presentation. At the time depicted in FIG. 2A, the presentation includes a car 225 being displayed on the left side of the display screen 220.

Figure 2B:
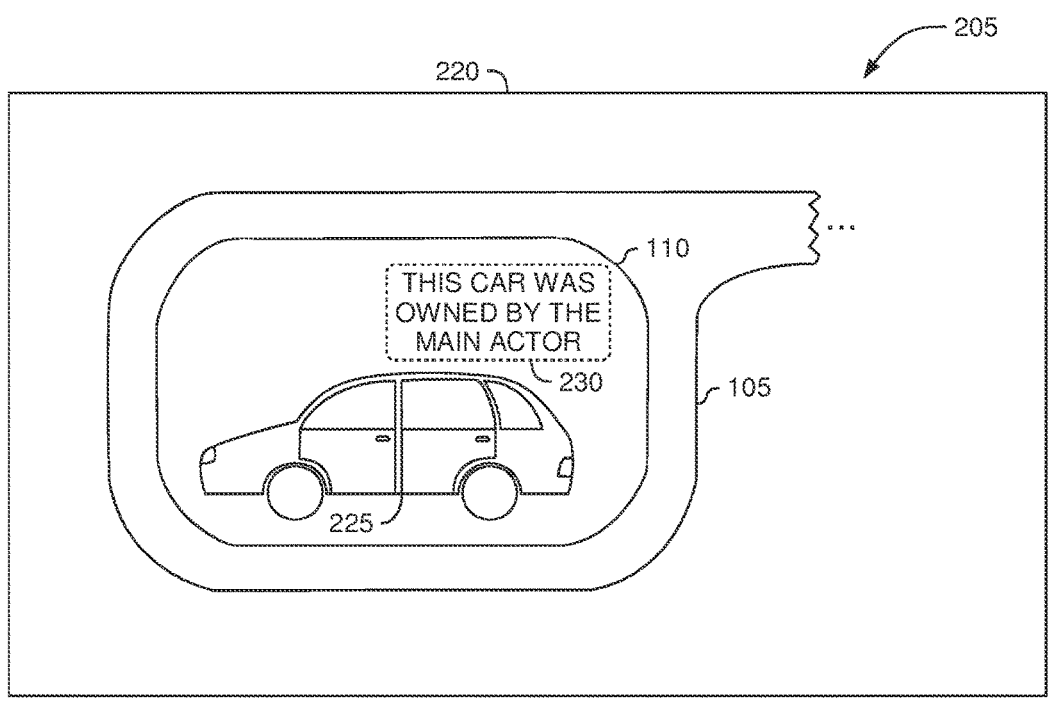

FIG. 2B illustrates a system 205 where the display screen 220 displays the same scene as the scene shown in FIG. 2A. However, FIG. 2B illustrates the view of a user who is watching the presentation using the user display unit 105, while FIG. 2A illustrates the view of a user who is watching the presentation without the unit 105. In FIG. 2B, the transparent display 110 outputs metadata 230 which describes a fact about the car 225. Thus, a user who is viewing the presentation without the aid of the display unit 105 would not see the metadata 230. Again, the display unit 105 is depicted as half of a pair of glasses that may be worn by the user; however, the unit 105 is not limited to such. For example, the display unit 105 may include a display 110 that the user holds between her eyes and the display screen 220 or a display 110 that hangs down from a visor worn on her head. In these examples, the display unit 105 may include only one display 110 rather than individual displays 110 for each eye.

In one aspect, the display unit 105 determines an initial location for the metadata 230 within the display 110. For example, the unit 105 may choose an initial location to avoid the metadata 230 from occluding the object it is describing (e.g., the metadata 230 does not overlay the car 225). For example, the display unit 105 may choose a portion of the display 110 for the metadata 230 that is displaying a portion of the presentation that is deemed irrelevant or less important than the metadata 230. Furthermore, the location of the metadata 230 may be selected such that the metadata 230 does not occlude a portion of the presentation deemed important (e.g., an actor who may be speaking or a location where the actors may be walking). However, alternatively, the metadata 230 may be displayed such that is occludes a portion of the object it is describing—e.g., car 225.

Figure 2C:
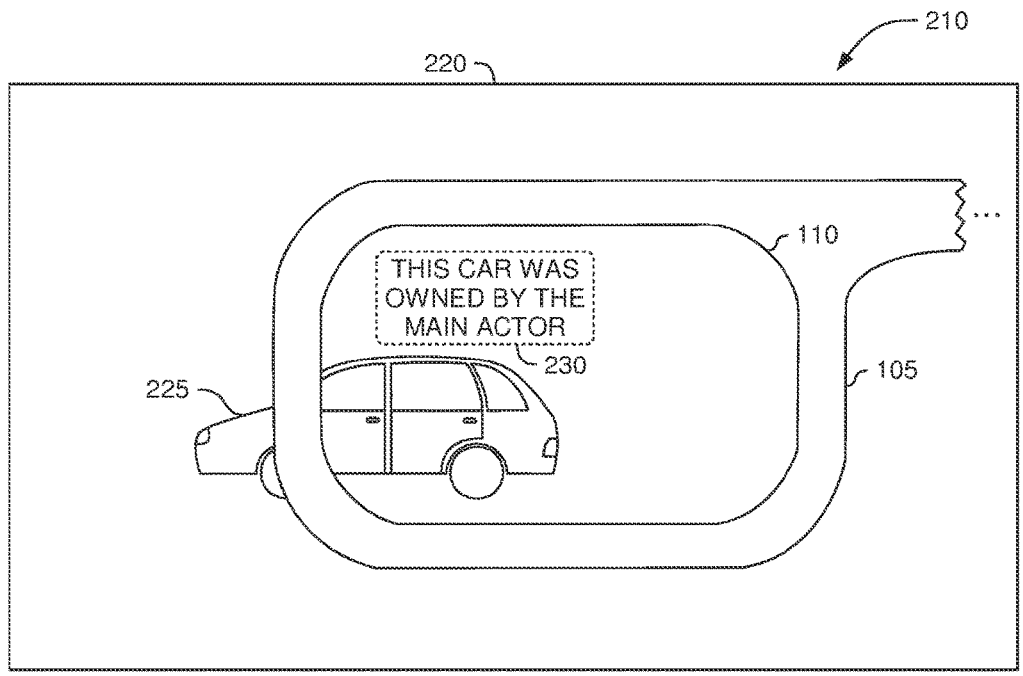

FIG. 2C illustrates a system 210 that occurs after the time corresponding to the system 205 illustrated in FIG. 2B. Here, the location of the car 225 in the display screen 220 remains the same as the location of the car 225 in FIG. 2B. However, the portion of the display screen 220 included within the display 110 has changed. That is, the user is now viewing a different portion of the screen 220 than she was in FIG. 2B. The change in orientation of the display unit 105 may be caused by the user moving her head such that the display unit 105 now includes a different portion of the display screen 220 than the portion shown in FIG. 2B. As such, if the display unit 105 continued to display the metadata 230 in the same location on display 110 as shown in FIG. 2B, the metadata 230 would still be in the upper right side of the display 110 even though the location of the car 225 in the display 110 has shifted to the right.

Instead, FIG. 2C illustrates that the display unit 105 alters the location of metadata 230 to track the location of the corresponding object (e.g., car 225) within the display 110. Stated differently, the location of the metadata 230 is altered based on the change of location of the object in the presentation. For example, the display unit 105 may maintain the substantially same spatial relationship shown in FIG. 2B between the car 225 and the metadata 230 within the display 110. That is, because the metadata 230 is located above and to the right of the car 225 in FIG. 2B, in FIG. 2C, the metadata 230 maintains the same spatial relationship.

In some examples, the spatial relationship may change slightly as the location of the object in the display 110 changes. For example, the user may have moved the display unit such that the user is now further from the display screen 220 in which case the car 225 may fill a smaller area in the display 110. The display unit may then decrease the distance between the nearest point of the car 225 from the nearest point of the displayed metadata 230 thereby slightly altering the spatial relationship between the car 225 and the metadata 230. In a similar example, the car 225 may be traveling in a direction that causes the dimensions of the car 225 to shrink in the display 110. In response, the unit 105 may again decrease the distance between the car 225 and the metadata 230. Nonetheless, even though the spatial relationship between the car 225 and metadata 230 may change slightly due to the object either becoming larger or smaller within the display 110, the spatial relationship is considered as remaining substantially the same.

Figure 2D:
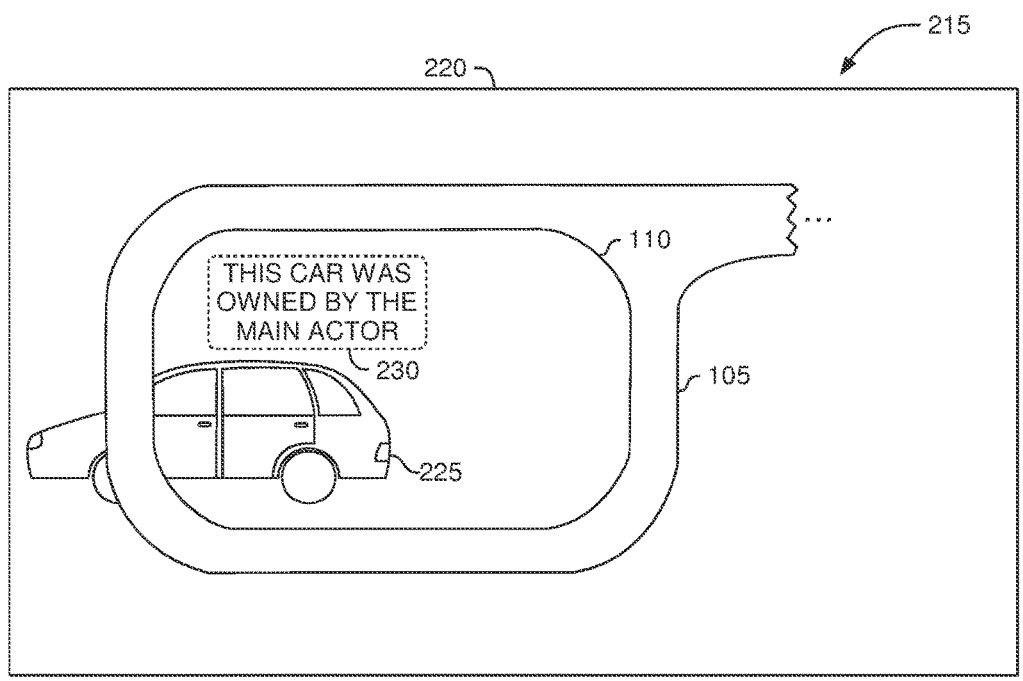

FIG. 2D illustrates a system 215 that occurs after the time corresponding to the system 205 illustrated in FIG. 2B. Unlike in FIG. 2C where the user changes the orientation of the display unit 105, here, the display unit 105 has remained stationary relative to the position of the unit 105 shown in FIG. 2B, but the position of the car 225 in the display screen 220 has changed. Specifically, the car 225 has shifted to the right so that only a portion of the car 225 remains in the display 110.

In response to the change in location of the car 225, the display unit 105 shifts the location of the metadata 230. For example, as will be described in greater detail below, a show controller that outputs the presentation to the display screen 220 may provide synchronization data such as time codes to the display unit 105. Using the time codes, the unit 105 can identify the current location of the car 225 in the display screen 220. Furthermore, because the display unit has determined the portion of the display screen 220 within display 110, the unit can ascertain what portion of the car 225 is within the display 110. With this information, the display unit then outputs the metadata 230 to maintain the same spatial relationship between the car 225 and the metadata 230 that was shown in FIG. 2B. Thus, regardless whether the orientation of the display unit 105 changes or the location of the object of interest in the presentation changes, the display unit 105 is able to track the location of the object relative to the display 110 and move the metadata 230 accordingly so that the user can easily ascertain that the displayed metadata 230 corresponds to the object. Furthermore, in the examples shown in FIGS. 2B-2D, the unit 105 tracks the location of the car 225 within the display 110 in order to maintain the substantially same spatial relationship as shown in FIG. 2B.

Figure 3A:
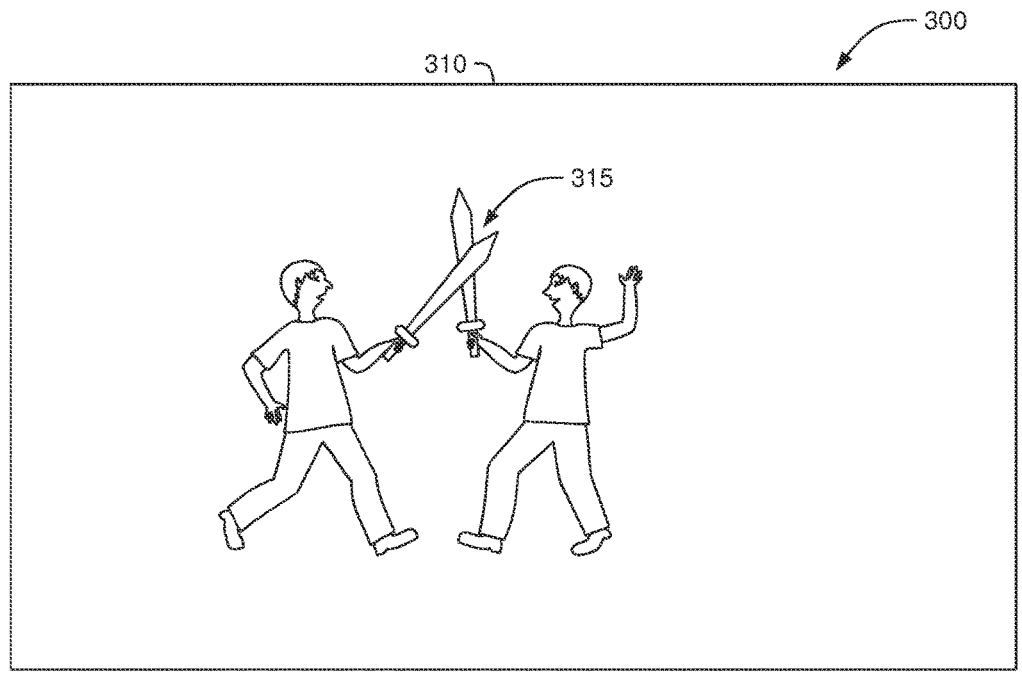
FIGS. 3A and 3B illustrate systems for providing metadata corresponding to an object in a media presentation, according to one embodiment described herein.
Figure 3B:
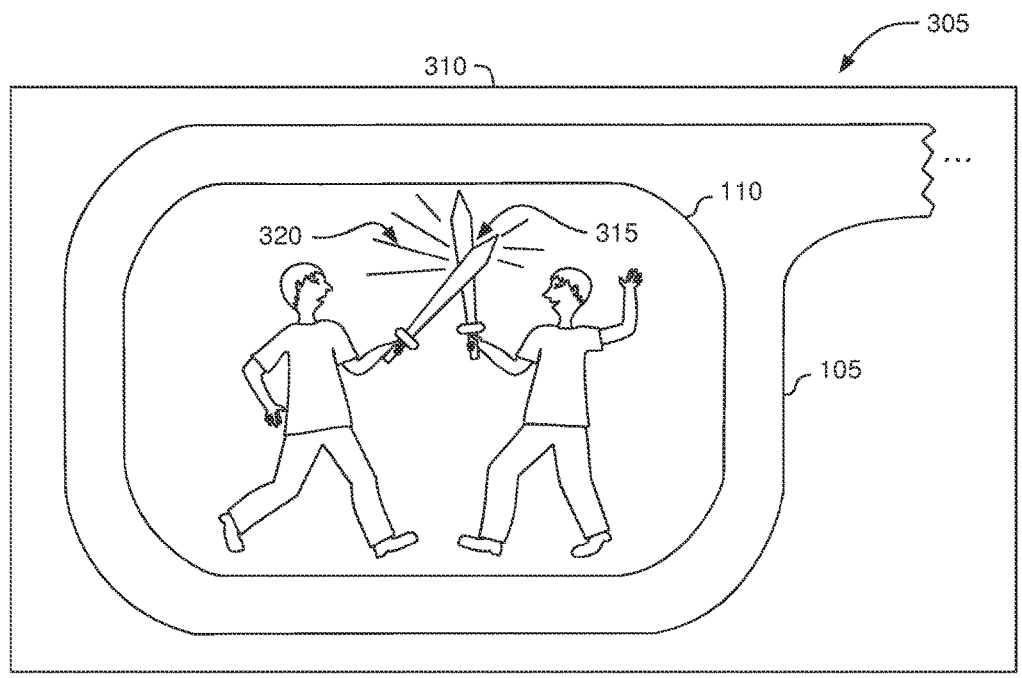

FIGS. 3A and 3B illustrate systems for providing metadata corresponding to an object in a media presentation, according to one embodiment described herein. In system 300 of FIG. 3A, a display screen 310 illustrates a scene where the swords between two fighters strike together. System 305 of FIG. 3B illustrates the same scene (i.e., the same instant of the media presentation) as seen by a user through the display unit 105. The swords striking together trigger an event 315 that is used by the display unit 105 to display metadata 320 on the display 110. Unlike the textual metadata illustrated in the previous figures, here the metadata 320 includes special effects that correspond to the event 315. For example, the metadata 320 may be sparks shooting away from the clashing swords. As described above, by determining the portion of the display screen 310 within display 110 and by synchronizing with a show controller, the display unit 105 outputs the metadata 320 to coincide with the event 315. Furthermore, the location of the metadata 320 is based on the location of the objects corresponding to the metadata 320 (e.g., the swords that caused the event 315).

The display unit 105 may update the location of the metadata 320 as the location of the corresponding object or objects change within the display 110. For example, the user may change the orientation of the display unit 105 or the objects may move within the presentation, or some combination of both. In any case, the special effects shown in FIG. 3B may be moved in order to track the movement of the swords in the display 110.

FIG. 3B illustrates just one example of special effects that may be displayed as metadata 320. For example, the display unit 105 may change the costume or one or more actors in the presentation. For example, when filming the media presentation the actor may have worn a suit of armor but the display unit 105 may use display 110 to overlay the suit with a clown outfit. Alternatively, the unit 105 may change the swords to light sabers. Thus, the display unit 105 provides an additional layer of customization without having to alter the underlying presentation.

Figure 4A:
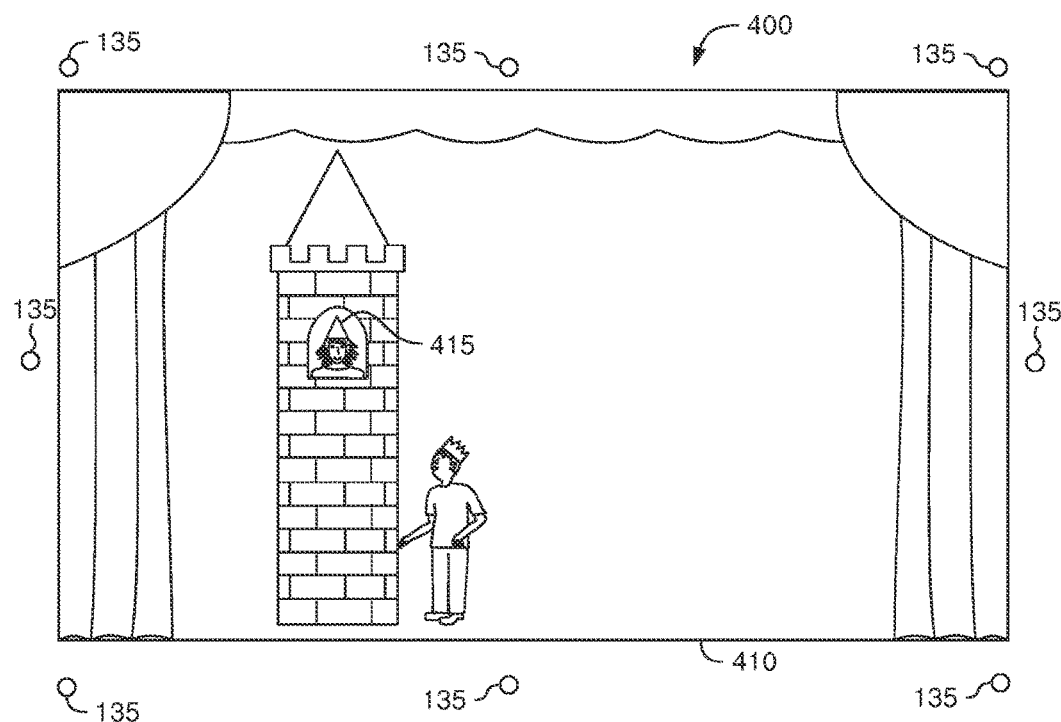
FIGS. 4A and 4B illustrate systems for providing metadata corresponding to an object in a live event, according to one embodiment described herein.
Figure 4B:
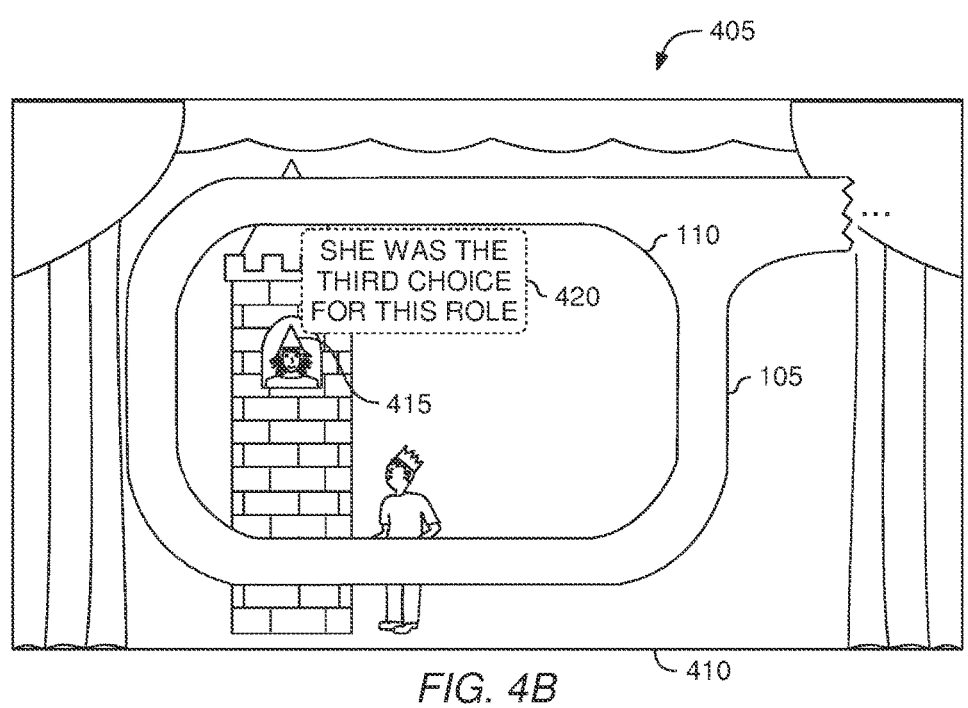

FIGS. 4A and 4B illustrate systems for providing metadata corresponding to an object in a live event, according to one embodiment described herein. Unlike in the previous examples where the presentation may be a recorded or broadcasted presentation, in FIGS. 4A and 4B, the presentation is a live event such as a stage performance by human actors or robots (e.g., animatronics). System 400 includes a stage 410 (e.g., a display area) that includes one or more objects (e.g., actors, props, etc.) that are part of the presentation. Like the display screen shown in FIG. 1, multiple emitters 135 may be spaced around the periphery of the stage. Moreover, to provide more granular location information, the emitters may be located on the stage 410 rather than at its periphery. For example, some or all of the emitters 135 may be integrated into props to reduce their visibility to the audience.

System 405 illustrates the view to a user who is viewing the same scene shown in FIG. 4A using the display unit 105. Here, the display 110 includes metadata 420 that informs the user that the actor 415 was the third choice for that role. Thus, by viewing the stage 410 through the display 110, the user is able to see the metadata 420 corresponding to the presentation without relying on a second screen.

In one aspect, the display unit 105 may track the object corresponding to the metadata 420. For example, as the actor 415 leaves the tower and moves across the stage 410, the unit 105 may update the metadata 420 to track the actor 415. To do so, a show controller may broadcast out time codes that indicate what particular scene is being performed on the stage 410. The display unit 105 is then able to derive where the actor 415 is generally located on the stage and display the metadata 420 near the actor 415. However, because a play with human actors may have greater uncertainty about the timing and the scenes than a recorded presentation or a robotic presentation, additional tracking information about the objects (e.g., props and actors) may be provided to the display unit 105 from the show controller. For example, the show controller may track the specific location of the actor 415 on the stage 410 and rely this information to the display unit 105 in addition to the time codes. Doing so may improve the ability of the display unit 105 to maintain the spatial relationship between the metadata 420 and the actor 415 in the display 110 as the location of the actor 415 within the display 110 changes.

In one aspect, instead of metadata 420 that includes text, the metadata may be a game (e.g., trivia), special effects corresponding to an object, and the like. For example, special effects such as fire may be displayed as metadata on the display 110 which may appear more realistic than props that simulate fire as well as provide a safer alternative than using actual fire on the stage 410.

Figure 5:
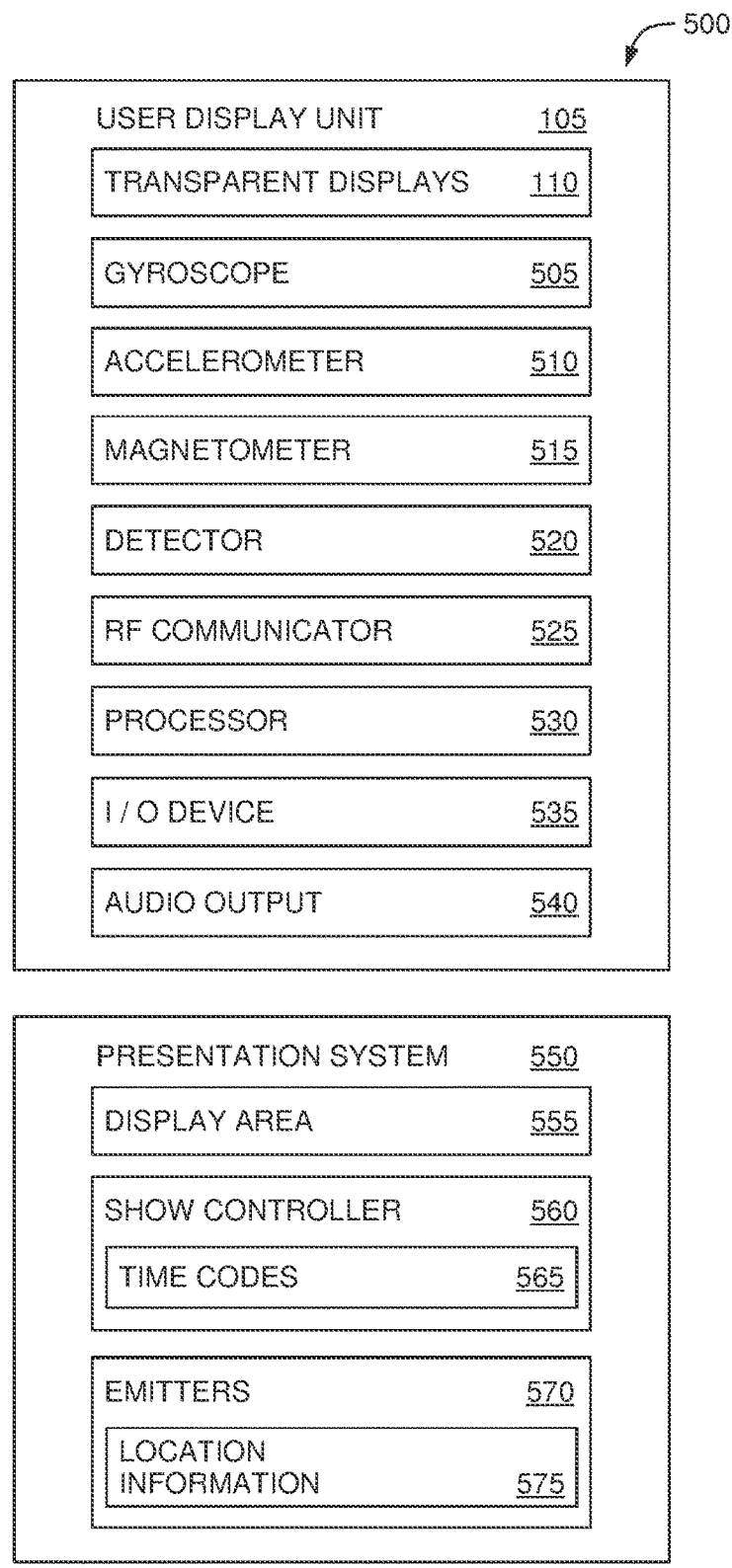
FIG. 5 illustrates a system for providing metadata on a user display unit corresponding to an object in an external display area, according to one embodiment described herein.

FIG. 5 illustrates a system 500 for providing metadata on the user display unit 105 corresponding to an object in an external display area 555, according to one embodiment described herein. The system 500 includes the user display unit 105 and a presentation system 550. The user display unit 105 includes one or more transparent displays 110 as described above that permit the unit 105 to display metadata corresponding to one or more objects in the presentation. For example, the metadata may correspond to a particular actor in the presentation or to the presentation as a whole (e.g., the geographic location depicted in the presentation). In one aspect, the unit 105 includes a display 110 for each eye.

The display unit 105 also includes a gyroscope 505, accelerometer 510, and magnetometer 515. In one aspect, these sensors may be located proximate to the display 110 so that the data generated by the sensors can be used to determine a position of the display 110. To do so, the physical spacing between the sensors and the display 110 in the display unit 105 may be fixed so that the data generated by these sensors can be used to identify the position of the display 110 in space. For example, the gyroscope 505 may generate data that indicates the orientation of the display 110, the accelerometers 510 indicates the acceleration of the display 110 as it is being moved, and the magnetometer 515 may indicate a direction the display 110 is facing (e.g., North, South, East, or West). The data generated by these sensors may be used to identify a portion of the presentation currently being viewed by the user through the display 110. In one aspect, the data generated by the gyroscope 505, accelerometer 510, and magnetometer 515 may be fused with the location information 575 received from the emitters 570 in order to determine what portion of the display area 555 is within the boundaries of the display 110. However, alternatively, the display unit 105 may have more or less sensors than the ones listed here. For example, the display unit 105 may not include any of these sensors but instead rely solely on the location information 575 provided by the emitters 570 to determine the portion of the display area 555 or where the display area 555 is located within the display 110 if the entire display area 555 is viewable through the display 110.

The display unit 105 includes one or more detector 520 for receiving the location information 575 provided by emitters 570. Like the sensors discussed above, the detectors 520 may have a fixed physical spacing relative to the display 110 so that location information 575 received by the detectors 520 can be used to determine the portion of the display area 555 viewable through the display 110. In one aspect, the location information 575 may be codes that uniquely identify respective emitters 570 that the display unit 105 can then use to determine what portion of the display area 555 is being viewed by the user. For example, when a user carries the display unit 105 into a theater, the display unit 105 may use a RF communicator 525 to receive the unique codes (and the corresponding locations of the emitters 570) from a show controller 560. Each time the display unit 105 enters into a different theater, the corresponding show controller 560 can send updated codes that correspond to the emitter layout of the current theater—e.g., different theaters may use different numbers of emitters or arrange the emitters differently.

When the detectors 520 receive one of the unique codes from an emitter 570, the display unit 105 determines that the display 110 is facing a portion of the display area 555 associated with the emitter 570. For example, if the unique code identifies an emitter 570 located at the upper right corner of the display area 555, the display unit 105 determines that the upper right corner of the display area 555 is viewable to the user through the display 110. As more and more unique codes are received, the display unit 105 may generate a bounded region using triangulation that indicates what portion of the display area 555 is within the boundary of the display 110. If a LOS technology is used for the emitters 570 and the detector 520 (e.g., IR transmitters and receivers), then the display unit 105 can assume that the display 110 is facing the emitters 570 (and the corresponding portion of the display area 555) whose codes have been received. By receiving unique codes from a plurality of emitters 570, the user display unit 105 is able to calculate a distance between the display 110 and the display area 555 which is used to calculate the bounded region.

In one aspect, the data provided by the gyroscope 505, accelerometer 510, and magnetometer 515 is fused with the location information 575 provided by the emitters 570 in order to adjust the placement of the bounded region. That is, the data provided by these sensors may be used to fine tune the bounded region generated using the positional information 575. For example, if the detector 520 received location information 575 from only two of the emitters 570, the resulting bounded region may be too inaccurate for maintaining a spatial relationship between the metadata and an object in the presentation. By fusing the location information 575 with the data provided by the gyroscope 505, accelerometer 510, and magnetometer 515, however, the display unit 105 is able to more accurately determine the bounded region and identify the portion of the display area 555 within the display 110.

The display unit 105 includes the RF communicator 525 which is used to establish communication with the show controller 560. For example, the RF communicator 525 may use radio waves to receive the unique codes corresponding to the emitters 570 and receive time codes 565 corresponding to different scenes of the presentation being performed in the display area 555. Using the time codes 565, the display unit 105 is able to determine the scene of the presentation currently being viewed on the display area 555. By combining this information with the bounded region, the display unit 105 determines what specific portion of the presentation is being viewed by the user through the display 110. Referring back to FIG. 1, the bounded region defines what portion of the display screen 130 is within the boundary of the display 110. Using the time codes, the display unit 105 determines what scene is currently being displayed on the display screen 130 and can then determine what objects in the scene are within the boundary of the display 110 (e.g., object 120) and what objects are outside its boundary (e.g., object 125). In one aspect, the display unit 105 displays metadata only for objects of a scene that are within the boundaries of the display 110. However, in one aspect, the display unit 105 may display the metadata for objects outside the boundaries of the display 110 but may provide an indicator such as an arrow pointing in the direction of the object that is outside the boundary of the display 110.

In one aspect, the user display unit 105 includes scene information stored in memory. The unit 105 may use the time codes 565 to lookup the corresponding scene information and determine if there is metadata for one or more objects in the scene. The display unit 105 may determine whether to display the metadata depending on user preferences (which will be discussed later) and whether the object is within the boundary of the display 110. Alternatively, the scene information may be transmitted to the display unit 105 from an external computing device (e.g., show controller 560). For example, the external computing device may monitor the time codes 565, and when the presentation reaches a scene that includes metadata, the device transmits the scene information to the display unit 105. The unit 105 may, in turn, determine whether the object corresponding to the metadata is currently within the boundary of the display 110, and if so, display the metadata. By doing so, the scene information does not need to be stored on memory within the display unit 105 which may reduce the cost and complexity of the units 105. Thus, the display unit 105 may receive time codes and/or scene information (referred to broadly as "synchronization information") for synchronizing the metadata with the presentation occurring in the display area 555.

The display unit 105 also includes a processor 530 which represents any number of special or general purpose processors which may include any number of processing cores. In one aspect, the display unit 105 uses the processor 530 to perform the functions discussed above such as processing the sensor data, generating the bounded region, determining whether an object is within the bounded region, and the like. Alternatively, the display unit 105 may rely on external processors to perform these calculations. For example, the unit 105 may transmit the data captured by the gyroscope 505, accelerometer 510, magnetometer 515, and detector 520 to an external computer which then calculates the bounded region and transmits the coordinates of the region to the unit 105. In one example, the calculations may be performed by an application executing on the user's personal smartphone. By leveraging the processing power of the user's personal device, the complexity of the user display unit 105 may be reduced.

The display unit 105 also includes an I/O device 535 which receives user input. In one aspect, the I/O device 535 (e.g., a wheel with an integrated toggle, a plurality of buttons, a depth camera for performing gesture recognition, and the like) provides the user with an interface for configuring the display unit 105. For example, the user may set the type of metadata she wishes to see displayed on the display 110. For instance, the user may wish to see metadata corresponding to actors but not metadata describing geographic locations. Or the user may wish to see text or images but not videos or games. The I/O device 535 may also be used to configure a language used for the text in the metadata, color scheme, duration the metadata is displayed, and the like. In one aspect, instead of integrating the I/O device 535 into the display unit 105, an external computing device such as a smartphone, tablet, central terminal, and the like may be used to set the user preferences of the user display unit 105. The selected preferences may then be transmitted to the display unit 105 using, e.g., the RF communicator 525.

The display unit 105 includes audio output 540 which may be used to provide audio output that corresponds to the metadata outputted on the display 110. For example, if the metadata is a video, the audio output 540 may be used to play audio corresponding to the video to the user. The audio output 540 may include speakers that are worn in, or proximate to, the user's ears or vibration elements contacting the user's head which introduce vibrations corresponding to the desired sound. In one aspect the audio output 540 is designed so that the user can hear the audio of the presentation when metadata is not being displayed. However, when metadata that has corresponding sound is being displayed, the audio output 540 may then begin outputting the sound which covers up the audio of the presentation.

In one aspect, the user display unit 105 is a wearable device. As defined herein, a wearable device is one that can be picked up and transported by a human being. In one aspect the wearable device may be wireless such that the device includes a battery and receives data from external devices using wireless data communication techniques. Alternatively, the wearable device may include one or more cables or ports for receiving power or data from an external source. In a different example, the user display unit 105 includes stabilization members that are used to arrange the transparent display between a viewer's eye and the presentation. For example, if embodied in a pair of glasses, arms of the glasses by used to stabilize the unit on the user's nose. Or the display unit 105 may include a hat or a visor worn on the viewer's head such that the transparent display 110 hangs down such that the display 110 is between the viewer's eyes and the display area 555. Alternatively or additionally, the display unit 105 may include clips or fasteners for attaching the display unit 105 to a user's clothing.

In one aspect, the unit 105 may also include separate structures that are communicatively coupled rather than being integrated into a single body. For example, the transparent display 110, gyroscope 505, accelerometer 510, and detector 520 may be located on a structure that is proximate to the user's head (e.g., a pair of glasses) while the other elements are located in a different structure which may also be carried by the user (e.g., a box clipped to the user's belt). A wire that carries data and power may communicatively couple the two structures, or the two structures may use wireless communication (assuming each structure has access to its own source of power).

The presentation system 550 may include a theater, a room in a house, a playhouse, or any other volume suitable for showing a presentation—e.g., a pre-recorded media presentation, a broadcasted presentation, a live orchestra, a play with live actors, an animatronic show, and the like. The display area 555 may be a projector screen (e.g., a theater screen), television, computer screen, a stage, and the like. The display area 555 includes a plurality of emitters 570 which are arranged in predefined locations in order to convey the location information 575 to the display unit 105 for ascertaining the bounded region—i.e., the portion of the display area 555 viewable by the user through the display 110. The system 550 also includes the show controller 560 which may be any computing system suitable for monitoring the presentation being displayed on the display area 555. For example, with a pre-recording media presentation or an animatronic show, the show controller 560 may determine when the specific scenes occur, and thus, knows the current time code 565. With live events such as a play or concert, the show controller 560 may monitor the objects (e.g., actors or musicians) in the display area 555 either by receiving input from a human director or programmatically using image tracking application and send this information to the display unit 105 which determines whether there is metadata associated with those objects.

Figure 6:
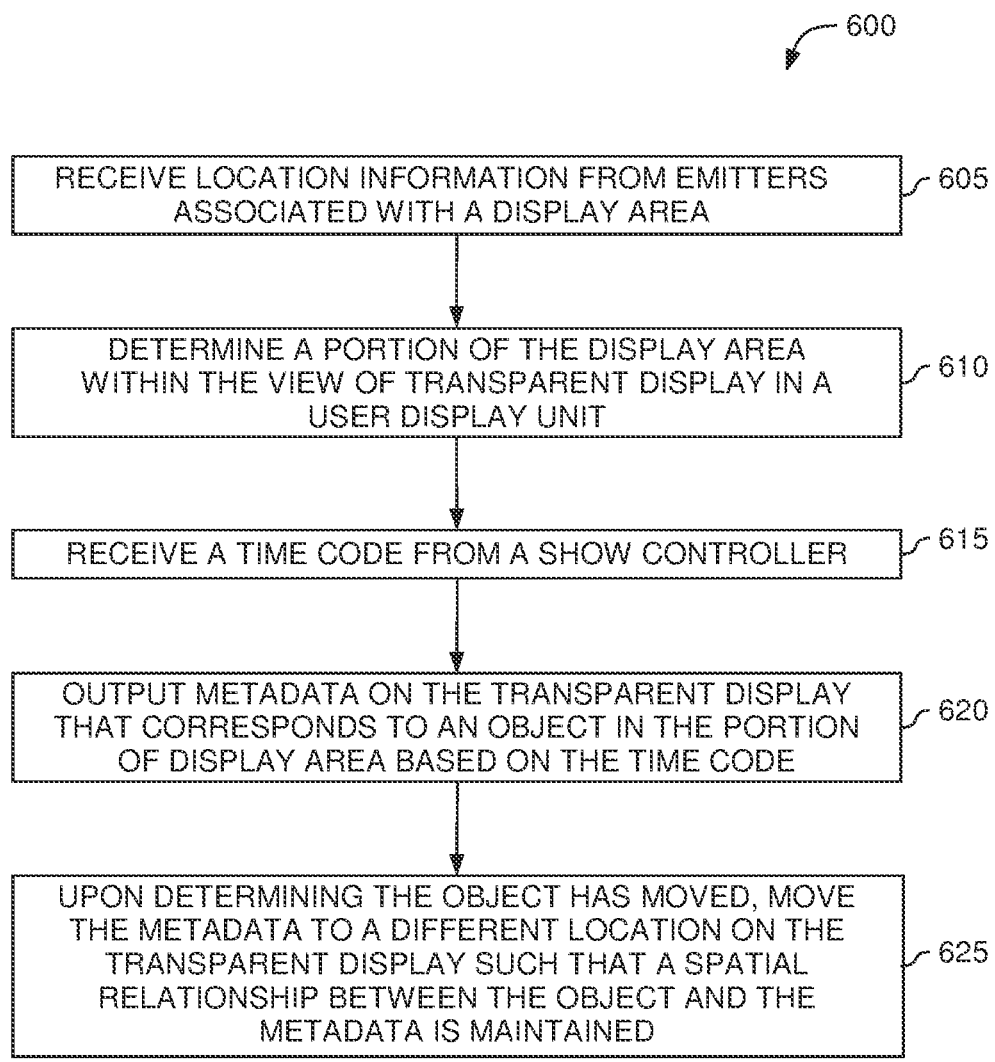
FIG. 6 is a method for maintaining a spatial relationship between metadata displayed on a user display unit and an object in a presentation, according to one embodiment described herein.

FIG. 6 is a method 600 for maintaining a spatial relationship between metadata displayed on a user display unit and an object in a display area, according to one embodiment described herein. At block 605, the display unit receives location information from emitters in a display area. The emitters are arranged in predefined arrangement such that the location information corresponds to a location or portion of the display area.

At block 610, the display unit determines a portion of the display area within the view of a transparent display. As discussed above, the location information may be used to form a bounded region which is then correlated to the view of user as she looks through the transparent display. For example, the emitters may use a LOS technology such as IR so that an IR detector on the display unit only receives the location information from emitters that face the detector. If the detector and the display face the same direction, then the display unit can determine that the display is facing the same emitters (and corresponding portion of the display area). In one aspect, the display unit may include other sensors besides the detector such as gyroscopes, accelerometers, magnetometers, etc. that provide data related to the orientation, direction, or elevation of the display. This data may be fused with the location information received from the emitters to adjust the location of the bounded region.

At block 615, the display unit receives a time code from a show controller that monitors or outputs a presentation on the display area. In one aspect, the time code indicates to the display unit what scene is currently being shown on the display area. The display unit can then determine if there is metadata associated with an object in the scene (e.g., an actor) or with the scene as a whole (e.g., the studio used to film the scene). If so, the display unit may determine whether the object corresponding to the metadata is within the bounded region—i.e., within the boundary of the transparent display. If not, the display unit may decide not to display the metadata, or instead, display an indicator such as a directional arrow to indicate where the user should turn her head in order to then see the object. Once the user moves the display to include all or a portion of the object, the display unit may then display the metadata.

At block 620, the display unit outputs the metadata on the transparent display. In one aspect, the display unit chooses a location within the display that indicates to the user what object in the scene the metadata describes. For example, the display unit may place the metadata proximate to the corresponding object, or use an arrow or line to point to the object. In this manner, the bounded region and the time code are used to identify what portion of the presentation is within the boundary of the display and whether there is metadata corresponding to one or more objects in that portion.

In one aspect, the display unit includes a module that tracks the gaze of the user. For example, the module may be able to identify which object within the presentation the user is currently looking at. The display unit can use this information to determine which object to select for displaying the metadata. For a particular scene, the display unit may have metadata for two different objects in the scene. Although the display unit can display the metadata for both objects, in one example, the gaze tracking module may be used to select the object the user is currently viewing and display the metadata only for that object. If the user then views the other object, the display unit may stop displaying the metadata for the previous object and display the metadata for the other object.

In another example, the display unit includes a peer-to-peer function that permits a first user to provide comments about the metadata being display on her transparent display to a display unit for a second user. For example, using an integrated or external I/O device, the first user is able to comment on, or select, the metadata currently being displayed by the display unit. The unit can then transmit these comments or selection to another display unit. For example, the first user could use the I/O device to say "Wow, I never knew that fact about this actor!" which can then be then presented for display on a friend's display unit who is watching the same presentation. The friends could either be in the same theater watching the same presentation, or the display unit could save the first user's comment and use them when the friend (i.e., a second user) is watching the same presentation at a different time (or location). Moreover, the first user could identify relevant and non-relevant metadata. The display unit could then transmit the first user's characterizations to another display unit which uses this information to determine what metadata to display to the second user and what metadata to ignore. This peer-to-peer communication may use a local connection between the display units (e.g., Bluetooth) or use a global communication network (e.g., the Internet).

At block 625, upon determining the object has moved to a different location in the transparent display, the display unit moves the metadata to a different location on the transparent display such that a spatial relationship between the object and the metadata is maintained. The display unit may determine that the object described by the metadata has moved in the presentation or that the user has moved the display thereby changing what portion of the display area is within the boundary of the display. In either example, the location of the object within the transparent display is moved to a different location. Stated differently, the user now views the object from a different location in the transparent display. An example of this is illustrated by FIGS. 2B-2D where the car 225 shifts to the left of the display 110. In response, the display unit moves the metadata to a different location based on the new location of the object in the display 110. This process is described in detail in the text accompanying FIGS. 2B-2D and will not be discussed again here.

In one aspect, the movement of the display unit or the object in the presentation may result in the display unit changing the spatial relationship between the object and the metadata. For example, the display unit may change the spatial relationship if the metadata was originally displayed to the right of the object but the object has now moved so far to the right in the transparent display that there is no longer enough room to display the metadata to the right of the object. In this case, the display unit may move the metadata using small increments from being positioned to the right of the object to being positioned above the object in the display so the metadata is not cut off. Alternatively, the display unit may shrink a characteristic of the metadata—e.g., shrink an image or reduce the text size—so the spatial relationship can be maintained.

In the preceding, reference is made to embodiments or aspects of the invention. However, it should be understood that the invention is not limited to specific described embodiments or aspects. Instead, any combination of the features and elements described above, whether related to different embodiments or not, is contemplated to implement and practice the invention. Furthermore, although embodiments or aspects of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the present disclosure, other and further embodiments of the disclosure may be devised without departing from the basic scope thereof, and the scope thereof is determined by the claims that follow.

What is claimed is:

1. A method, comprising:

receiving synchronization information associated with a media presentation being displayed on a display screen, wherein the synchronization information identifies a first position of a virtual object as displayed on the display screen;

receiving positional information from a plurality of emitters arranged in a predefined pattern relative to the display screen;

determining, based on the positional information, what portion of the media presentation is visible through a transparent display separate from the display screen, from an orientation of the transparent display relative to the display screen, wherein determining what portion of the media presentation is visible through the transparent display is based on unique codes received from individual emitters arranged in a predetermined pattern relative to the display screen that indicate which emitters of the plurality of emitters are visible to the transparent display;

determining, based on the unique codes that identify a physical location and a current orientation of the transparent display relative to the display screen, a first location of the virtual object on the transparent display as visible through the transparent display;

displaying metadata at a second location, different from the first location, on the transparent display based on the first location of the virtual object as visible through the transparent display, the metadata corresponding with the virtual object; and upon determining that the virtual object has moved from the first location on the transparent display to a third location different from the first location, displaying the metadata at a fourth location on the transparent display different from the second location to maintain a spatial relationship between the metadata in the transparent display and the virtual object.

2. The method of claim 1, wherein the synchronization information comprises a time code corresponding to a scene in the media presentation.

3. The method of claim 1, wherein the display screen is one of a projector screen and a television.

4. The method of claim 1, wherein the transparent display is a wearable device.

5. The method of claim 1, wherein determining the orientation of the transparent display relative to the display screen includes receiving orientation data from a gyroscope and an accelerometer associated with the transparent display.

6. A display unit, comprising a transparent display that permits a user to view a media presentation displayed on a display screen external to the display unit;

a communicator configured to receive synchronization information associated with the media presentation, wherein the synchronization information identifies a position of a virtual object as displayed on the display screen;

a receiver configured to receive code information from a plurality of emitters arranged in a predefined pattern relative to the display screen, wherein the code information identifies a current physical location and a current orientation of the display unit relative to the display screen to determine a first location of the virtual object on the transparent display, and what portion of the virtual object is visible through the transparent display based on unique codes received from individual emitters that indicate which emitters of the plurality of emitters are visible to the transparent display;

a processor configured to perform an operation, the operation comprising:

displaying metadata at a second location on the transparent display, different from the first location, based on the first location of the virtual object as visible through the transparent display, the metadata corresponding with the virtual object; and upon determining that the virtual object has moved to a third location different from the first location on the transparent display, displaying the metadata at a fourth location on the transparent display different from the second location to maintain a spatial relationship between the metadata in the transparent display and the virtual object on the transparent display.

7. The display unit of claim 6, wherein the synchronization information comprises a time code corresponding to a scene in the media presentation.

8. The display unit of claim 6, the display unit is a wearable device.

9. The display unit of claim 6, wherein the code information received by the receiver includes one or more codes uniquely associated with a corresponding one or more emitters of the plurality of emitters, wherein a given code identifies a respective emitter of the plurality of emitters to the receiver.

10. The display unit of claim 6, further comprising:

an accelerometer;

a gyroscope; and wherein determining the orientation of the transparent display relative to the display screen includes receiving orientation data from the gyroscope and the accelerometer.

11. A non-transitory computer-readable storage medium storing instructions, which when executed by a processing device, perform an operation for displaying metadata in a transparent display, the operation comprising:

receiving, at a display device including the transparent display, at least one unique code from a plurality of unique codes that identify a respective emitter of a plurality of emitters arranged in a predetermined pattern relative to a display screen providing a media presentation, wherein the display screen is separate from the display device;

determining, based on the at least one unique code received, a physical location for the display device relative to the display screen;

determining an orientation of the transparent display relative to the display screen;

receiving synchronization information associated with the media presentation, wherein the synchronization information identifies a position of a virtual object as displayed on the display screen;

determining what portion of the media presentation is visible through the transparent display based on which unique codes of the plurality of unique codes are received to indicate which emitters of the plurality of emitters are visible to the transparent display;

determining a first location for the virtual object on the transparent display as viewable through the transparent display;

displaying metadata at a second location, different than the first location, on the transparent display based on the first location of the virtual object as visible through the transparent display, the metadata corresponding with the virtual object; and upon determining the virtual object has moved to a third location different than the first location on the transparent display, displaying the metadata at a fourth location on the transparent display different from the second location to maintain a spatial relationship between the metadata in the transparent display and the virtual object as viewable through the transparent display.

12. The non-transitory computer-readable storage medium of claim 11, wherein determining the orientation of the transparent display relative to the display screen includes receiving orientation data from a gyroscope and an accelerometer.

13. The non-transitory computer-readable storage medium of claim 11, wherein the virtual object moves to the third location on the transparent display while remaining at the position on the display screen when the transparent display is reoriented relative to the display device while remaining at the physical location.

14. The non-transitory computer-readable storage medium of claim 11, wherein the virtual object moves to the third location on the transparent display by moving from the position on the display screen to a new position on the display screen while the transparent display maintains the orientation and remains at the physical location.

15. The non-transitory computer-readable storage medium of claim 11, further comprising:

in response to determining that the virtual object on the display device is not viewable through the transparent display, ceasing display of the metadata.

* * * * *